United States Patent [19]

Michimoto et al.

[11] Patent Number: 4,881,883

[45] Date of Patent: Nov. 21, 1989

[54] SYSTEM FOR CONTINUOUSLY PRODUCING PLATE-SHAPED CATALYSTS

[75] Inventors: Takashi Michimoto; Saburo Kudo; Kazuhiko Kuwada; Nobuyoshi Ishida, all of Kure, Japan

[73] Assignee: Babcock-Hitachi Kabushiki Kaisha, Tokyo, Japan

[21] Appl. No.: 165,472

[22] Filed: Mar. 8, 1988

[30] Foreign Application Priority Data

Mar. 9, 1987 [JP] Japan ................................ 62-53686

[51] Int. Cl.$^4$ ............................................. B29C 43/58
[52] U.S. Cl. ........................................ 425/89; 72/420; 425/142; 425/303; 425/444
[58] Field of Search ......................... 72/420; 29/6, 2; 83/255, 225, 224, 209, 216, 236, 211, 369; 425/142, 303, 444

[56] References Cited

U.S. PATENT DOCUMENTS

| | | | |
|---|---|---|---|
| 3,400,622 | 9/1968 | Olsen | 83/210 |
| 3,583,268 | 6/1971 | Scribner | 83/225 |
| 3,712,163 | 1/1973 | Vinson | 83/255 |
| 3,768,349 | 10/1973 | Cauffiel | 83/236 |
| 4,567,630 | 2/1986 | Ishida et al. | 29/6.2 |
| 4,603,611 | 8/1986 | Ferguson | 83/277 |

Primary Examiner—Willard Hoag
Attorney, Agent, or Firm—Fay, Sharpe, Beall, Fagan, Minnich & McKee

[57] ABSTRACT

A system for continuously producing plate-shaped catalysts includes a mold press machine for press-molding a belt-shaped catalyst into a predetermined form. Two pairs of reciprocating grip delivery mechanisms are provided at the downstream side of the mold press machine. A cutting device is provided at the downstream side of the pair of belt-shaped catalyst grip delivery mechanisms. The length of the catalyst is detected after it passes through a cutting device. The cutting device is operated in response to a signal from the length detector. Control of the grip and delivery mechanisms includes performing a pass of delivery of the plate-shaped catalyst and release of the gripping mechanisms as necessary during cutting of the plate-shaped catalyst. The mold press can be operated continuously and the cutting is performed to always produce plate-shaped catalyst members having the predetermined length.

10 Claims, 7 Drawing Sheets

SYSTEM FOR CONTINUOUSLY PRODUCING PLATE-SHAPED CATALYSTS

BACKGROUND OF THE INVENTION

1. Field of the Invention

This invention relates to a system for producing a plate-shaped catalyst, and more particularly to a system for continuously producing plate-shaped catalysts, wherein plate-shaped catalysts are continuously molded and cut by a predetermined length.

RELATED PRIOR ART

Continuous punching and continuous molding of a belt-shaped catalyst article to be molded, the ordinary course of things are carried out, such that the operations including continuous molding, continuous punching and cutting are performed without stopping the molding press. Furthermore, as there is a system wherein a molding tool and cutting blades should unavoidably be installed on machines separate of each other, there has also been known a continuously molding system wherein articles are cut, with the cutting blades being moved so as to meet the movements of the moving articles.

A system for continuously producing plate-shaped catalysts has been known wherein a belt-shaped catalysts is press-worked, thereafter, a position to be cut is detected by a detection signal from a sensor, and the belt-shaped catalyst is cut by a predetermined length (U.S. Pat. No. 4,567,630). In this continuously producing system, the molding press is temporarily stopped in operation, then, a plate-shaped catalyst is cut from the belt-shaped catalyst, and thereafter, the molding press is restarted to produce the plate-shaped catalyst. Accordingly, the work of pressing the belt-shaped catalyst and the work of cutting the plate-shaped catalyst from the belt-shaped catalyst has been carried out by intermittent operations. FIGS. 7a, 7b and 7c show the steps performed in the system for continuously producing the above-described plate-shaped catalysts. The system includes: roll feeders 12 for feeding a belt-shaped catalyst 1; a top die 7 and a bottom die 8 of a molding press for molding the belt-shaped catalyst 1 fed by the roll feeders 12, into a predetermined form; a crank mechanism 9 for operating the top die 7 and the bottom die 8 of the molding press; clamps 14 for clamping and fixing the belt-shaped catalyst 1 thus supplied; a top cutting blade 4 and a bottom cutting blade 5, which are provided at the downstream side of the clamps 14; and a position sensor-abutting stopper 6 provided at the downstream side of the cutting blades 4 and 5. With the above-described arrangement, as shown in FIG. 7a, the belt-shaped catalyst 1 is supplied between the top and bottom dies 7 and 8 by the roll feeders 12. This belt-shaped catalyst is pressed into a predetermined form by the top and bottom dies 7 and 8 of the molding press in electrical association with the crank mechanism 9. When the belt-shaped catalyst 1 thus pressed comes into the abutting contact with the position sensor-abutting stopper 6, the clamps 14 are actuated to clamp the belt-shaped catalyst 1 as shown in FIG. 7b, the top die 7 of the molding press stops at a top dead center 9A of the crank mechanism 9 (Refer to FIG. 4 to be discussed hereunder), and cutting operation is carried out by the cutting blade 4, whereby the plate-shaped catalyst 2 is cut off the belt-shaped catalyst 1 as shown in FIG. 7c.

FIGS. 1 and 2 are explanatory views showing the outlines of press molding of the belt-shaped catalyst and the cutting work of the plate-shaped catalyst. The belt-shaped catalyst 1 is intermittently delivered from left to right in FIG. 1 by the roll feeders 12 as shown in FIGS. 7a, 7b and 7c, and successively molded by the top and bottom dies 7 and 8 of the molding press in its widthwise direction into forms A—A, B—B (a convex shape 3a and a concave shape 3b in section), C—C, D—D (a convex shape 3c and a concave shape 3d), E—E, F—F ( a convex shape 3e and a concave shape 3f in section) and G—G, H—H (a convex shape 3g and a concave shape 3h in section) as shown in FIG. 2. In short, in the belt-shaped catalyst 1, from the center to the opposite sides thereof, first, the convex shape 3a and the concave shape 3b, next, the convex shape 3c and the concave shape 3d, subsequently, the convex shape 3e and the concave shape 3f, and then, the convex shape 3g and the concave shape 3h are pressed, whereby the belt-shaped catalyst 1 is pressed. Subsequently, the belt-shaped catalyst 1 is delivered to the top cutting blade 4 and the bottom cutting blade 5 and cut into the plate-shaped catalyst 2 of the predetermined length by the top cutting blade 4 descending in response to a signal from the position sensor-abutting stopper 6, whereby the plate-shaped catalyst 2 having a predetermined form and the predetermined length is produced. Additionally, during molding by this press, polyethylene sheets are inserted between the outer surface of the belt-shaped catalyst 1 and the top die 7 of the molding press and between the rear surface of the belt-shaped catalyst 1 and the bottom die 8 of the molding press, respectively, so that the top and bottom dies 7 and 8 of the molding press are not directly brought into contact with the outer surface and rear surface of the belt-shaped catalyst 1 to protect the both surfaces thereof. However, in FIGS. 1 and 2, the mechanism that covers with the polyethylene sheets, a mechanism for delivering the belt-shaped catalyst 1 and the dies of the molding press are not shown.

FIG. 8 shows another example of the mechanism for supplying the belt-shaped catalyst 1, wherein a gripper 10 and a delivery cylinder 11 are used, and FIG. 9 shows another one wherein as the similar delivering mechanism, a delivery crank 13 is provided on the crank mechanism 9 so as to operate the roll feeders 12 in association with the top die 7 of the molding press. In the embodiments shown in FIGS. 8 and 9, the other parts including the clamps 14, the top and bottom cutting blades 4 and 5, and the position sensor-abutting stopper 6 are similar to those shown in FIGS. 7a to 7c.

However, in all of the above-described systems, the belt-shaped catalyst 1 is pressed into the plate-shaped catalyst 2, the delivery operation is temporarily stopped and the belt-shaped catalyst 1 is fixed by the clamps 14. Thereafter, the belt-shaped catalyst 1 is cut by the top and bottom cutting blades 4 and 5, and then, the delivery molding press machine is restarted, thus presenting such disadvantages that the delivery operation has to be interrupted for every cut, whereby the operating efficiency of the molding press is greatly lowered, so that the efficient production cannot be carried out.

Furthermore, according to the conventional techniques, simple punching is carried out at a speed of the press strokes being more than 1000/min, while, complicated and continuous molding is normally carried out at a speed of about 120–150/min. When cutting is performed at the above-described molding speed, with the interruption of the continuous molding operation, intervals required for position detection, stop of delivery, stop of pressing, fixing of the article, cutting, return of the cutting blades to the initial positions, restart of delivery and pressing has been 1–3 secs. Further, in the continuous molding of the plate-shaped catalysts for denitration as disclosed in U.S. Pat. No. 4,567,630, the molding operations of 120 times per minute is the maximum speed. The time interval of interrupting the press operations for the aforesaid cutting needs about 3 seconds against the molding time interval of about 7 seconds. Accumulated interrupting time intervals lower the operating efficiency by about 30%, for example. Furthermore, the molding press is abruptly stopped once every ten minutes, for example, so that brake members may be damaged.

In molding the above-described belt-shaped catalyst 1, such a method is adopted that catalytic paste which is coated on the metal plate is prevented from adhering to the top and bottom dies 7 and 8 of the molding press. Furthermore, in molding, to make smooth the sliding of the belt-shaped catalyst 1 between the top and bottom dies 7 and 8 of the molding press so as to facilitate molding, protective sheets like polyethylene sheets are placed above and below the belt-shaped catalyst 1 and the belt-shaped catalyst 1 is delivered in this sandwich manner into the top and bottom dies 7 and 8 of the molding press step by step for a predetermined length. However, in the case where plastic sheets are used as the protective sheets, actually, the predetermined length may or may not be obtained because the sheets are easily slidable. When the step by step feeding by the predetermined length cannot be performed, the molding operation and cutting operation are temporarily interrupted, therefore the length must be adjusted, thus presenting a problem of making the operations complicated.

SUMMARY OF THE INVENTION

The present invention has been developed to obviate the above-described disadvantages of the prior art and has as its object the provision of a system for continuously producing plate-shaped catalysts, wherein, without interrupting the operations of a mold press machine, press molding, feeding by a predetermined length and cutting by a predetermined length can be efficiently carried out, thus improving the operating efficiency.

To achieve the above-described object, the present invention resides in a system for continuously producing plate-shaped catalysts, including: a mold press machine for press-molding a belt-shaped catalyst into a predetermined form; a pair of means for delivering the belt-shaped catalyst, provided at the downstream side of the mold press machine and each having a grip mechanism; a cutting device provided at the downstream side of the pair of belt-shaped catalyst delivering means; means for detecting that the belt-shaped catalyst, after passing through the cutting device, has reached a predetermined position; cutting control means for operating the cutting device in response to a signal from the detecting means; grip-delivery control means, in which one of the pair of delivery means is performing grip and delivery, the other prepares grip and delivery, and, after the preparation is completed, the succeeding delivery operation is carried out by change of grips; and means for performing pass of delivery of the belt-shaped catalyst and release of the gripping as necessary while the states of delivery and cutting of the belt-shaped catalyst are being monitored; whereby carrying out continuously a series of steps including press-molding, delivery and cutting the plate-shaped catalyst by a predetermined length.

With the above-described system, the time for the interruption of the press operation and the time for the restart can be saved, and the interruption for the delivery can be reduced to the utmost, so that the plate-shaped catalysts can be efficiently produced. Furthermore, the time intervals of abrupt stops of the press operations be decreased, so that the above-described system is advantageous from the viewpoint of the maintenance.

BRIEF DESCRIPTION OF THE DRAWINGS

The above and other objects and features of the present invention will become more apparent with reference to the following descriptions given in conjunction with the accompanying drawings, wherein similar reference numerals mean similar elements, and in which.

DESCRIPTION OF THE PREFERRED EMBODIMENTS

Figure 1:
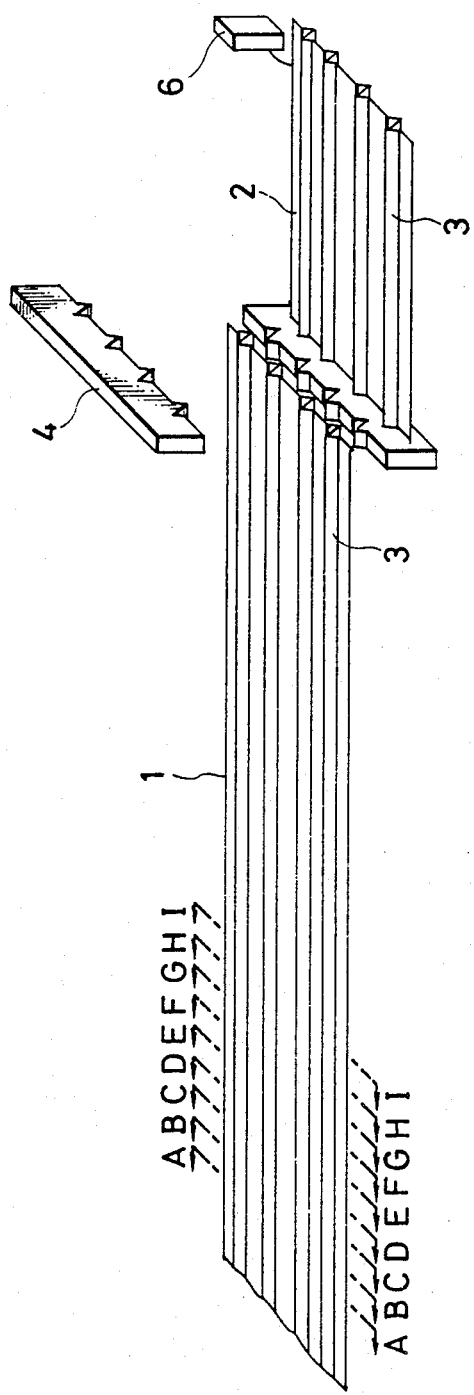
FIG. 1 is an explanatory view of the system continuously producing the plate-shaped catalyst of the present invention.
Figure 2:
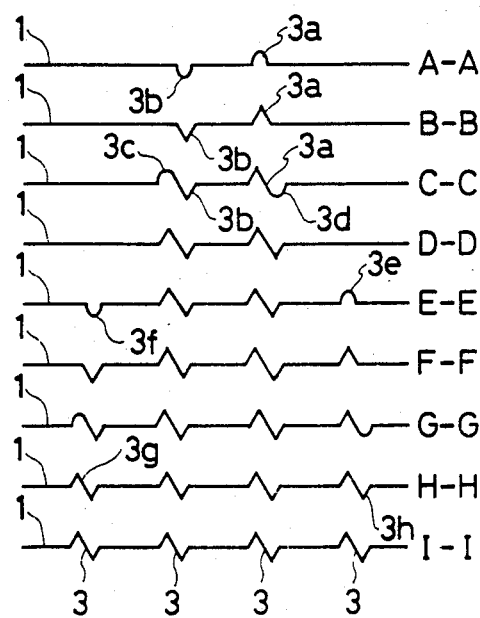
FIG. 2 is a sectional view showing the various portions of FIG. 1.
Figure 3:
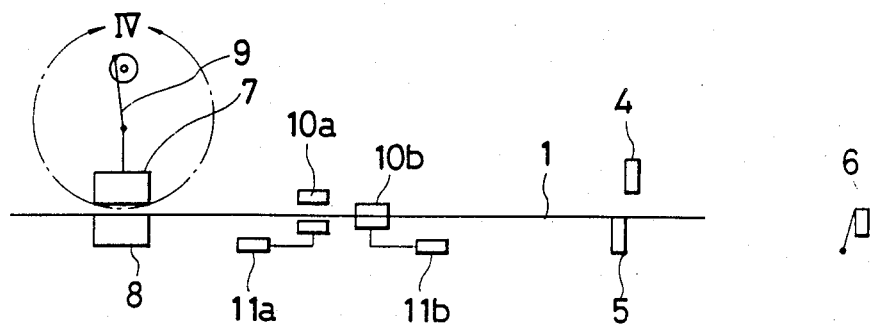
FIG. 3 is an explanatory view showing the outline of the system for continuously producing the plate-shaped catalysts according to the present invention.
Figure 4:
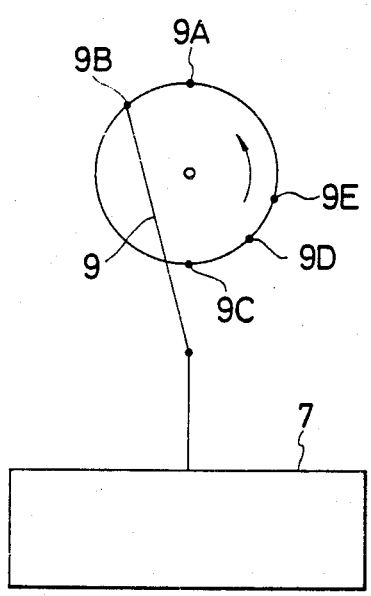
FIG. 4 is an explanatory view showing a crank mechanism for operating the mold press machine.

The continuously producing system shown in FIG. 3 principally includes: a mold press machine having a top force 7 and a bottom die 8 of a molding press; a pair of gripping mechanisms (grippers) 10a and 10b provided at the downstream side of the mold press machine; a pair of belt-shaped catalyst delivering means (delivery cylinders) 11a and 11b; a cutting device 4 provided at the downstream side of the delivery means; detecting means 6 for detecting that a belt-shaped catalyst 1, after passing through the cutting device 4, has reached a predetermined position; and cutting control means for operating the cutting device 4 in response to a signal from the detecting means 6 having a limit switch. To make the vertical movement, the top die 7 of the molding press has a crank mechanism 9. The gripper 10a is connected to the delivery cylinder 11a and the gripper 10b is connected to the delivery cylinder 11b, respectively, whereby the grippers 10a and 10b are driven by the reciprocatory movement of the cylinders 11, so that the belt-shaped catalyst 1 can be delivered step by step. More specifically, there is provided grip-delivery control wherein a first pair that includes gripper 10b and delivery cylinder 11b performs grip and delivery of the belt-shaped catalyst 1, and wherein a second pair that includes gripper 10a and delivery cylinder 11a prepares for grip and delivery of the belt-shaped catalyst 1. After the grip and delivery with the first pair is completed, a succeeding grip and delivery operation by the second pair of gripper 10a and delivery cylinder 11a is carried out. These operations are repeated until the belt-shaped catalyst moves forwards and abuts against the position sensor-abutting stopper 6. The grip-delivery control means is associated with the movement of the crank mechanism 9 of the top die 7 of the molding press as shown in FIG. 4. In FIG. 4, at the position 9C of a crank pin of the crank 9, the top die 7 of the molding press descends for pressing and a signal for releasing the grip of the grippers 10a and 10b is delivered. At the position 9D of the crank 9, gripping of the belt-shaped catalyst 1 by one of the grippers is carried out. The delivery of the belt-shaped catalyst 1 starts at the position 9E and ends at the position 9B where changing of grips is carried out. Positions 9A and 9C show a top dead center and a bottom dead center of the crank 9, respectively. Further, such control means is provided that in the case where the crank 9 is to reach the delivery start position 9E at the time of cutting of the belt-shaped catalyst by the cutting blade 4, a delivery signal for moving forward the belt-shaped catalyst is passed, and in the case where the crank 9 is in the position of 9E to 9B, that is in the midst of the stroke of the cylinders 11a, 11b, a signal for releasing the grip is delivered so that the grippers 10 are released, and the delivery cylinders 11a, 11b, are operated to dead centers of the stroke to wait for the succeeding signal. Thus a series of operations of the press molding, delivery and cutting by the predetermined length of the plate-shaped catalyst can be continuously carried out without stopping the normal operation of molding press and cutting device 4.

A specific embodiment of the present invention will hereunder be described with reference to FIGS. 5a to 5p.

Figure 5A:
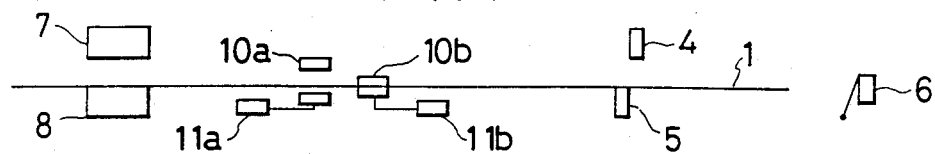
FIGS. 5a to 5p show explanatory views of various operation positions of the devices constituting the system of the present invention.
Figure 5B:
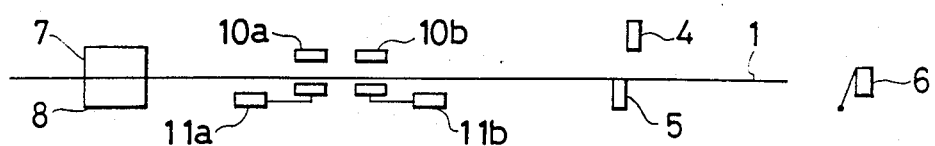
Figure 5C:
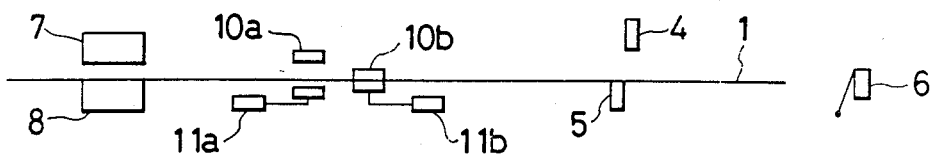
Figure 5D:
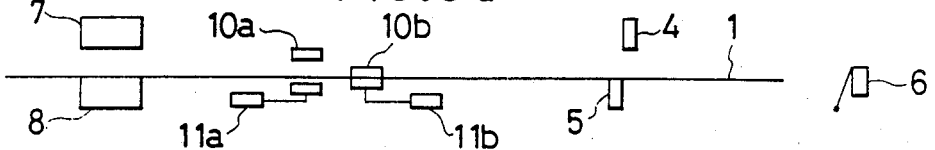
Figure 5E:
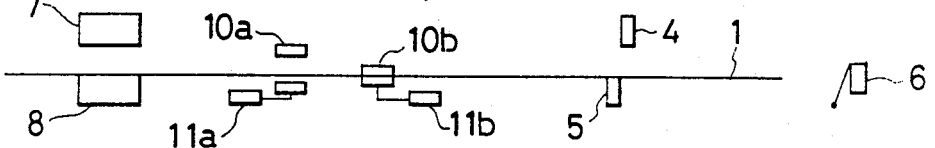
Figure 5F:
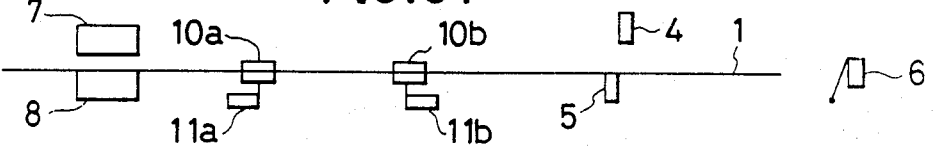
Figure 5G:
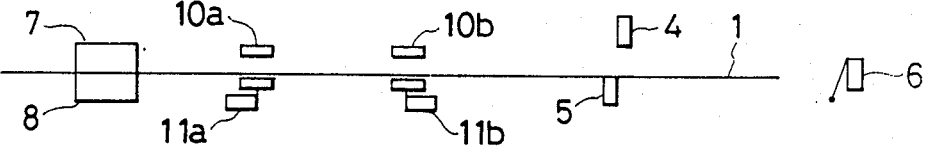
Figure 5H:
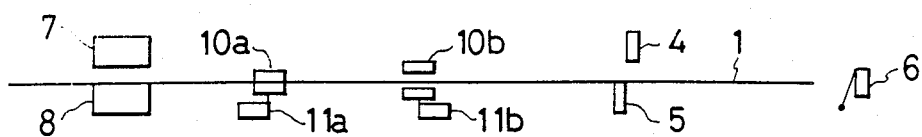
Figure 5I:
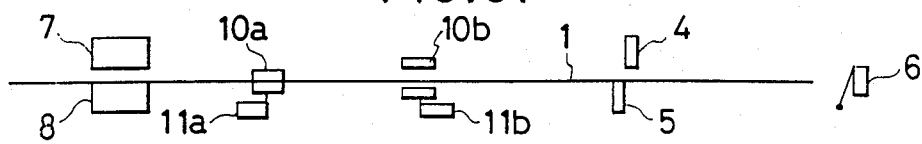
Figure 5J:
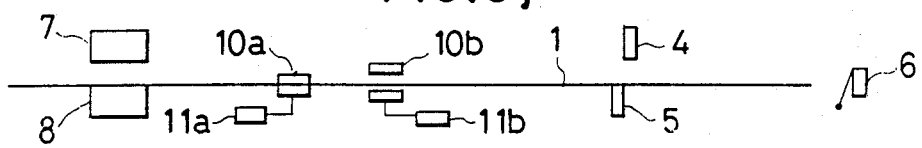
Figure 5K:
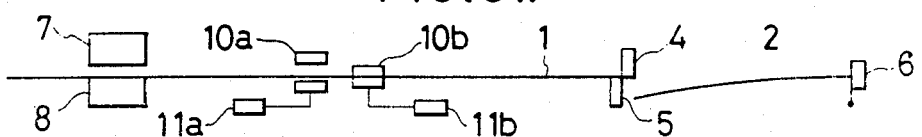
Figure 5L:
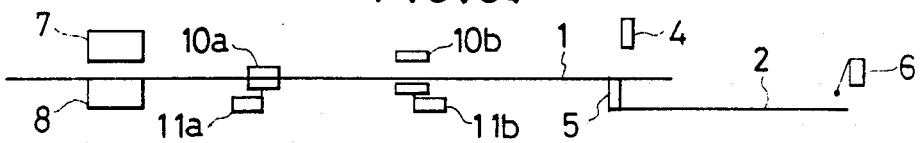
Figure 5M:
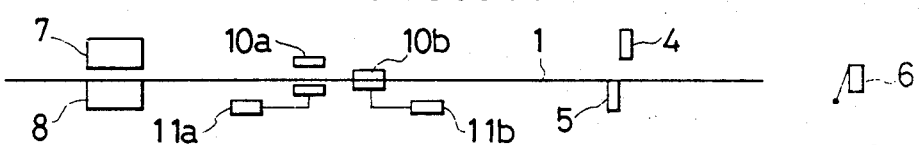
Figure 5N:
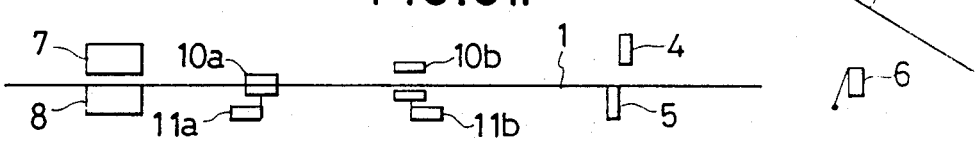
Figure 5O:
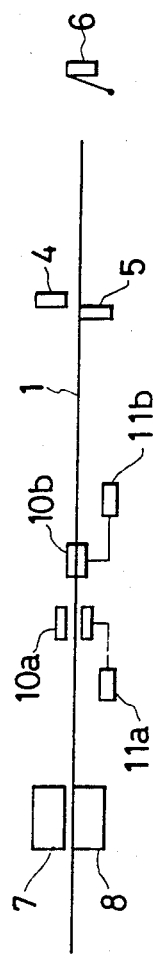
Figure 5P:
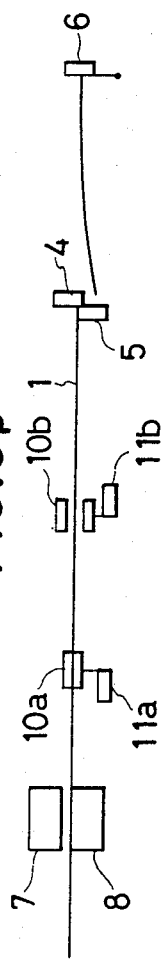

First, FIG. 5a shows a state where the top die 7 (or the crank 9) of the molding press is positioned at the top dead center 9A (FIG. 4). FIG. 5b shows a state where the grippers 10 are open and the crank 9 of the molding press is positioned at the bottom dead center 9C. FIG. 5c shows a state where the gripper 10b grips the belt-shaped catalyst 1 when the crank 9 is positioned at a grip position 9D (FIG. 4). FIG. 5d shows a state where the delivery is started at a delivery start position 9E of the crank 9. FIG. 5e shows a state where the top die 7 of the molding press starts to descend when the crank 9 is positioned at the top dead center 9A. FIG. 5f shows a state where the delivery of the belt-shaped catalyst is completed at a changing grip position 9B of the crank 9. FIG. 5g shows a state where the grippers 10 are open and the molding press works at the bottom dead center 9C of the crank 9. FIG. 5h shows a state where the gripper 10a grips the belt-shaped catalyst at the grip point 9D of the crank 9. FIG. 5i shows a state where the delivery is started at the delivery start position 9E of the crank 9. FIG. 5j shows a state where the molding press (top die 7) starts to descend when the crank 9 is positioned at the top dead center 9A. FIG. 5k shows a state where the tip end of the belt-shaped catalyst 1 reaches the position sensor-abutting stopper 6 which delivers a signal for descending the top cutting blade 4, to a source for driving the cutting blade 4 to cut off the belt-shaped catalyst 1. If the tip end of the belt-shaped catalyst does not reach the stopper 6, a series of operations starting from the state of FIG. 5b, passing through FIGS. 5c, 5d, 5e, 5f, 5g, 5h, 5i, 5j and ending at FIG. 5m are repeated until the state shown in FIG. 5k or FIG. 5p is reached. After cutting off the belt-shaped catalyst as shown in FIG. 5k, a series of the operations shown in FIGS. 5l, 5m, 5n and 5o which shows the state where the delivery of the belt-shaped catalyst is completed at the change of grip position 9B of the crank 9 are carried out until the next cutting of the belt-shaped catalyst occurs as shown in FIG. 5p.

When no slip occurs between the gripper 10a or 10b with the plastic sheets placed on both surfaces of the belt-shaped catalyst 1, the above-described operations are repeated. Whereas, when a slip or slips occur between the grippers 10a or 10b and the plastic sheet, the delivery pitch may be shifted. Further, when the belt-shaped catalyst 1 abuts against the position sensor-abutting stopper 6 to start cutting, or during the cutting, the delivery cylinders 11 are sometimes in the midst of the stroke, which causes a problem that the belt-shaped catalyst cannot be cut off at an equal pitch or that the plate-shaped catalyst obtained is bent.

To prevent the problem from occurring, control is performed such that the grippers 10 are released to avoid applying an excessive force to the belt-shaped catalyst, and the delivery cylinders 11 work to the stroke ends to wait for the succeeding signal. Furthermore, when the delivery start position 9E is reached during the cutting, control is performed such that a delivery start signal is passed and the top cutting blade 4 waits for the succeeding signal (after the top cutting blade 4 returns to the original position of the top dead center).

Thus, in the case of the normal operations where the grip point does not slip in the delivery mechanism, cutting can be performed without stopping the delivery operation. Furthermore, when the delivery start position 9E is reached during cutting of the plate-shaped catalyst due to slip of the grip point and the like, the situation can be dealt with by passing of the delivery. Further, when the delivery is in the midst of cutting, the situation can be dealt with by gripper releasing, so that the operations can be continued with the vertical movement of the molding press without stopping. Furthermore, since the delivery mechanism is provided at the downstream side of the molding press, the easily deformable articles can be delivered without deforming.

The resulting plate-shaped catalyst 2 having a predetermined size may be removed from the system by use of a roller conveyor, for example.

Figure 6:
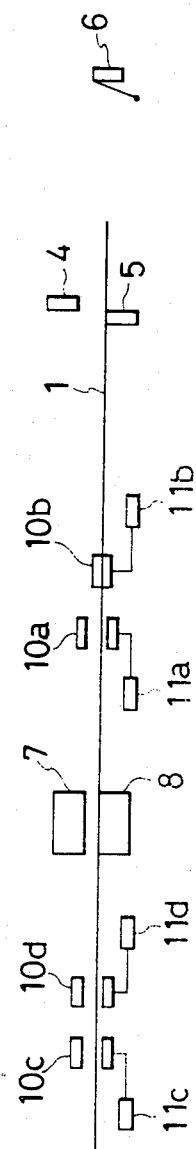
FIG. 6 shows another embodiment of the system of the present invention.

FIG. 6 shows another embodiment of the present invention, wherein grip feeders (gripper 10c, 10d and delivery cylinder 11c, 11d) are provided at the upstream side of the molding having dies 7, 8 in addition to the downstream side thereof, so that delivery of the belt-shaped catalyst 1 into the molding press is performed by the grip feeders 10c, 11c, 10d and 11d at the upstream side, and, after the belt-shaped catalyst has reached the downstream side, molding delivery is performed only by the grippers 10a, 10b and the delivery cylinders 11a, 11b at the downstream side.

According to this embodiment, although the provision of the grip feeders increases the installation cost, such advantages can be attached that a molding start section can be formed to save the loss of the belt-shaped catalyst, and delivery of the catalyst into the press is carried out easily and safely.

Figure 7A:
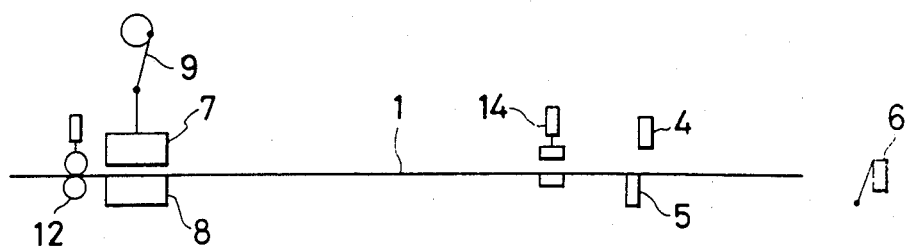
FIGS. 7a to 7c, 8 and 9 are explanatory views of the conventional system for producing the plate-shaped catalyst, respectively.
Figure 7B:
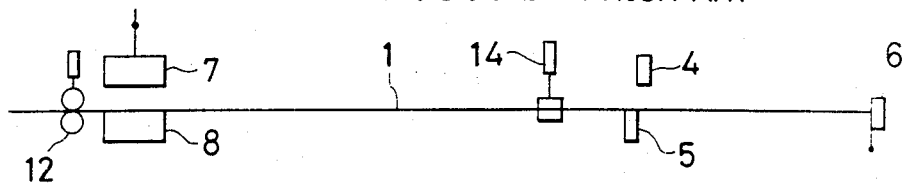
Figure 7C:
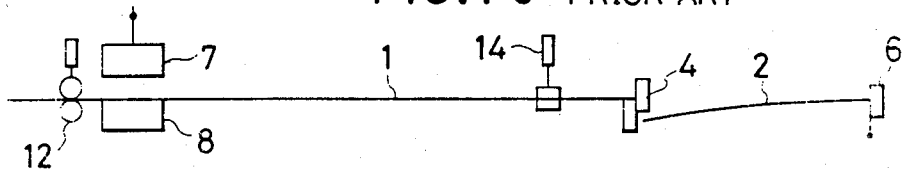
Figure 8:
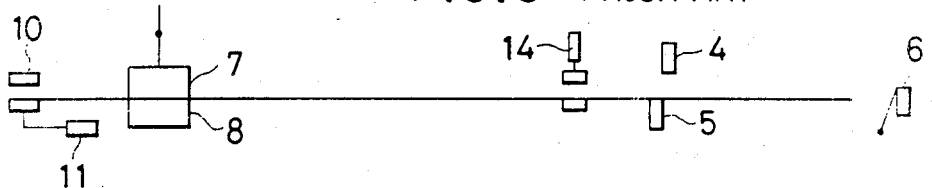
Figure 9:
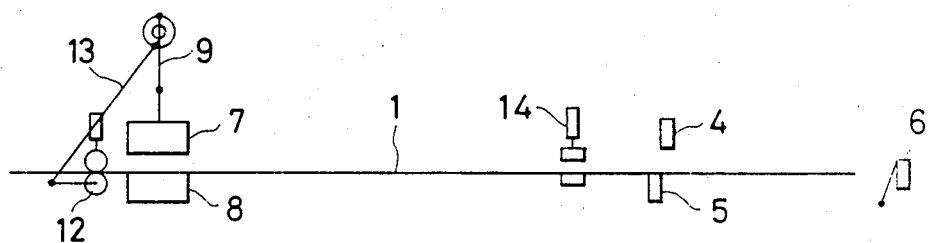

In the above embodiment, the grip feeders at the upstream side may be replaced by conventional roll feeders 12 shown in FIGS. 7a-7c, or by roll feeders 12 mechanically associated with the press as shown in FIG. 9.

The present invention with the above-described arrangement can attain the following advantages.

(1) Cutting of the belt-shaped catalyst can be performed with the vertical movement of the molding press without stopping of the device.

(2) In the case of the normal operations where the grip point does not slip in the delivery mechanism, cutting can be performed with the delivery not being stopped, and the continuous molding with no interruption can be carried out.

(3) When the delivery start point is reached during cutting, the situation can be dealt with by passing of the delivery, and, when the delivery is in the midst of cutting, the situation can be dealt with by gripper releasing, so that the operations can be continued with the vertical movement of the molding press not being stopped. Under the requirements of the normal operations described in Items (1) and (2), continuous molding without interruption can be carried out. However, in actuality, the timings described in Item (3) are very few.

With the above-described arrangement, the press molding operating efficiency is greatly increased by 30% or more for example, and abrupt stops of the molding press are limited to an emergency case and a case of work interruption, whereby the number of accidents causing damage to the brakes is sharply decreased.

What is claimed is:

1. An apparatus for continuously producing plate-shaped catalysts, comprising:
    a mold press machine having a top die and a bottom die for press-molding a belt-shaped catalyst into a predetermined form, means for moving said top die vertically and reciprocally including said top die being connected with a crank mechanism to make the vertical and reciprocal movement of said top die;
    a pair of means for delivering the belt-shaped catalyst, provided at the downstream side of said mold press machine and each having means for gripping the belt-shaped catalyst;
    grip-delivery control means for controlling said delivering means in accordance with the movement of said crank mechanism so that when one of said pair of delivering means is performing grip and delivery, the other prepares for subsequent grip and delivery so that after grip and delivery of said one pair is completed, a succeeding grip and delivery operation is carried out by the other pair of delivering means and the belt-shaped catalyst is delivered in response to a delivery signal generated cyclically in accordance with the movement of said crank mechanism;
    a cutting device provided at the downstream side of said pair of delivering means for cutting said belt-shaped catalyst into plate-shaped catalysts;
    means for detecting that the belt-shaped catalyst, after passing through said cutting device, has reached a predetermined position;
    cutting control means for operating said cutting device in response to a signal from said detecting means; and
    said grip-delivery control means including means for performing a pass of a signal for delivery of said belt-shaped catalyst and a release of the gripping means when the delivery signal is generated in the midst of operating said cutting device.

2. Apparatus for continuously producing plate-shaped catalysts according to claim 1, wherein said detecting and cutting control means comprise a limit switch which is provided at said predetermined position.

3. Apparatus for continuously producing plate-shaped catalysts according to claim 1, further including second means for delivering the belt-shaped catalyst positioned on the upstream side of the mold press machine.

4. The apparatus for continuously producing plate-shaped catalysts according to claim 1, wherein each of said means for gripping includes an upper gripper and a lower delivery cylinder positioned on opposite sides of said belt-shaped catalysts, wherein said gripper is controlled by said grip-delivery control means to release the belt-shaped catalysts when the delivery signal is generated in the midst of operating said cutting device.

5. The apparatus for continuously producing plate-shaped catalysts according to claim 4, wherein said gripper that is released is positioned on the same side of said belt-shaped catalysts as said top die.

6. The apparatus for continuously producing plate-shaped catalysts according to claim 5, wherein each of said means for gripping includes an upper gripper and a lower grip delivery cylinder positioned on opposite sides of said belt-shaped catalysts, wherein said gripper is controlled by said grip-delivery control means to release the belt-shaped catalysts when the delivery signal is generated in the midst of operating said cutting device.

7. The apparatus for continuously producing plate-shaped catalysts according to claim 6, wherein said gripper that is released is positioned on the same side of said belt-shaped catalysts as said top die.

8. An apparatus for continuously producing plate-shaped catalysts, comprising:
    a mold press machine having a top die and a bottom die for press-molding a belt-shaped catalyst into a predetermined form, said top die being connected with a crank mechanism to make a vertical and reciprocal movement of said top die;
    means for feeding plastic sheets onto top and bottom surfaces of the belt-shaped catalyst at the upstream side of the mold press machine, and recovering said plastic sheets at the downstream side of the mold press machine,
    a pair of means for delivering the belt-shaped catalyst covered with the plastic sheets, provided at the downstream side of said mold press machine and each having means for gripping the belt-shaped catalyst;
    grip-delivery control means for controlling said delivery means in accordance with the movement of said crank mechanism so that when one of said pair of delivering means is performing grip and delivery, the other of said pair of delivering means prepares for subsequent grip and delivery so that after the grip and delivery is completed by said one delivering means, a succeeding grip and delivery operation is carried out by said other delivering means and the belt-shaped catalyst is delivered in response to a delivery signal generated cyclically in accordance with the movement of said crank mechanism;
    a cutting device for cutting the belt-shaped catalyst into plate-shaped catalysts, provided at the downstream side of said pair delivering means;

means for detecting that the belt-shaped catalyst, after passing through said cutting device, has reached a predetermined position;

cutting control means for operating said cutting device in response to a signal from said detecting means;

said grip-delivery control means including means for performing a pass of the signal for delivery of said belt-shaped catalyst and a release of the gripping means when the delivery signal is generated in the midst of operating said cutting device.

9. An apparatus for continuously producing plate-shaped catalysts according to claim 1, wherein said detecting and cutting control means comprises a limit switch that is provided at said predetermined position.

10. An apparatus for continuously producing plate-shaped catalysts according to claim 1, further including means for delivering the belt-shaped catalyst at the upstream side of the mold press machine.

* * * * *